US007642765B2

United States Patent
Condemine et al.

(10) Patent No.: US 7,642,765 B2
(45) Date of Patent: Jan. 5, 2010

(54) MONOLITHIC MINIATURE VOLTAGE CONVERTER WITH VERY LOW INPUT VOLTAGE

(75) Inventors: Cyril Condemine, Grenoble (FR); Denis Duret, Grenoble (FR); Helene Lhermet, Meylan (FR)

(73) Assignee: Commissariat a l'Energie Atomique, Paris (FR)

( * ) Notice: Subject to any disclaimer, the term of this patent is extended or adjusted under 35 U.S.C. 154(b) by 302 days.

(21) Appl. No.: 11/631,526

(22) PCT Filed: Jul. 11, 2005

(86) PCT No.: PCT/FR2005/050568

§ 371 (c)(1),
(2), (4) Date: Jan. 4, 2007

(87) PCT Pub. No.: WO2006/008423

PCT Pub. Date: Jan. 26, 2006

(65) Prior Publication Data

US 2007/0223255 A1    Sep. 27, 2007

(30) Foreign Application Priority Data

Jul. 13, 2004    (FR) .................................. 04 51519

(51) Int. Cl.
   *G05F 5/00*    (2006.01)
(52) U.S. Cl. ..................... 323/299; 307/46; 327/143
(58) Field of Classification Search ................. 323/299, 323/901; 307/39, 29, 46, 43, 72, 75, 86, 307/134–135; 327/143; 363/49; 713/340
   See application file for complete search history.

(56) References Cited

U.S. PATENT DOCUMENTS

| 5,338,625 | A | * | 8/1994 | Bates et al. | .................. | 429/322 |
| 6,351,073 | B1 | | 2/2002 | Rapeanu | | |
| 6,655,035 | B2 | * | 12/2003 | Ghandi et al. | ................ | 310/339 |
| 6,703,810 | B2 | * | 3/2004 | Peschke | ....................... | 320/128 |
| 6,969,981 | B1 | * | 11/2005 | Fairbanks et al. | ........... | 323/299 |
| 2004/0080304 | A1 | | 4/2004 | Takehara | | |
| 2004/0095263 | A1 | * | 5/2004 | Thomas | ....................... | 341/53 |
| 2004/0100241 | A1 | | 5/2004 | Abo | | |

OTHER PUBLICATIONS

"MAXIM 5V or Adjustable, Low-Voltage, Step-Up DC-DC Controller", XP-002167281, Sep. 1995, pp. 1-12.
J. B. Bates, et al. "Rechargeable Thin-Film Lithium Microbatteries", Solid State Technology, XP-009017126, Jul. 1993, pp. 59-62, 64.
"Application Note 710 Dail-Up Networking with the DS80C400 Microcontroller", Dallas Semiconductor MAXIM, May 14, 2003, 9 pages, also available at web address http://www.maxim-ic.com/appnotes.cfm/appnote_number/710.
"Microbatteries on ASIC to Reinforce the Safety of Chip Cards", CEA-Technologies, No. 67, Sep. 2003.
Michel Girard, et al. "Switched-Mode Power Suplies", Collection Science Sup, Nov. 2003, 4 cover pages, 4 page table of contents, 1 forword page, 1 page Introduction chapter-4.4, and pp. 58-88.

* cited by examiner

*Primary Examiner*—Adolf Berhane
*Assistant Examiner*—Harry Behm
(74) *Attorney, Agent, or Firm*—Oblon, Spivak, McClelland, Maier & Neustadt, L.L.P.

(57) ABSTRACT

A DC voltage conversion device including a DC/DC converter and an energy reservoir capable of providing a starting voltage to the DC/DC converter.

19 Claims, 7 Drawing Sheets

MONOLITHIC MINIATURE VOLTAGE CONVERTER WITH VERY LOW INPUT VOLTAGE

TECHNICAL FIELD AND PRIOR ART

The invention relates to the field of low power converters with low input voltage.

The invention also relates to the field of monolithic analog integrated circuits for electronics, and more particularly to that of so-called switching voltage converters: these are devices which, connected to a voltage source which is variable over a wide range, for example from 0.5 V to 15 V, are capable of generating a set controlled voltage for example of 3.3 V, for supplying power to electronic circuits.

Applications of low voltage converters are notably supplying electric power to so-called communicating objects and mobile objects.

With these converters, it is possible to obtain voltages suitable for supplying power to electronic circuits from different configurations of electric cells or batteries.

The catalogs of various specialized manufacturers, suppliers of voltage converters, describe such devices.

SII-IC may notably be mentioned (see http://www.sii-ic.com/).

Another manufacturer is MAXIM (http://www.maxim-ic.com). Application note AN 710 of this manufacturer explains the operation of this type of device (see http://www.maxim-ic.com/cfm/appnotes_number/710).

The best of these known devices can only convert voltages from about 0.9 V.

Taking into account the development of mobile electronic devices and the reduction of their power consumption, the problem is posed of finding power sources other than customary cells, such as the standard one <<R3>> of 1.5 V.

Another problem is to be able to use these sources until quasi-complete discharge and in any case less than 0.9 V.

Therefore, it is of a technical and economical interest of having a circuit with which sources with a lower voltage than 0.9 V, typically up to a few tens of mV, may be used.

The threshold voltage for operating known converters stems from the, physics of the active devices implanted in the integrated circuits (MOS type transistors).

A search for devices with a lower input voltage is performed.

DISCUSSION OF THE INVENTION

The invention relates to a DC voltage conversion device comprising means forming a DC/DC converter, characterized in that it further comprises complementary means providing energy or voltage, forming an energy or voltage reservoir for providing a starting voltage at the input of the DC/DC converter.

According to the invention, an energy reservoir (for example a rechargeable battery) is used for providing the converter with the voltage which it needs upon starting.

The voltage of this reservoir may be coupled to means, for example an electronic architecture, with which the converter may be <<started>>.

The converter may in turn after starting, recharge the energy reservoir by means of its output voltage which is greater than the voltage of the energy reservoir.

Thus, low input voltages may be used, for example between 10 mV and 0.1 V or 0.5 V, in order to be able to start a converter, these low input voltages being compensated by the contribution from the energy reservoir or by complementary means providing energy. The converter will in turn be able to generate a set controlled voltage, for example 3.3 V, for supplying power to electronic circuits.

The invention also proposes a standby circuit comprising means for comparing an input voltage with a threshold value, means for enabling comparison means, and means for maintaining the level of the result of the comparison when the comparison means are disabled.

The standby circuit preferably has extremely low power consumption, for the case when the converter should remain in a waiting position for a long time.

SHORT DESCRIPTION OF THE FIGURES

DETAILED DISCUSSIONS OF PARTICULAR EMBODIMENTS

Figure 1:
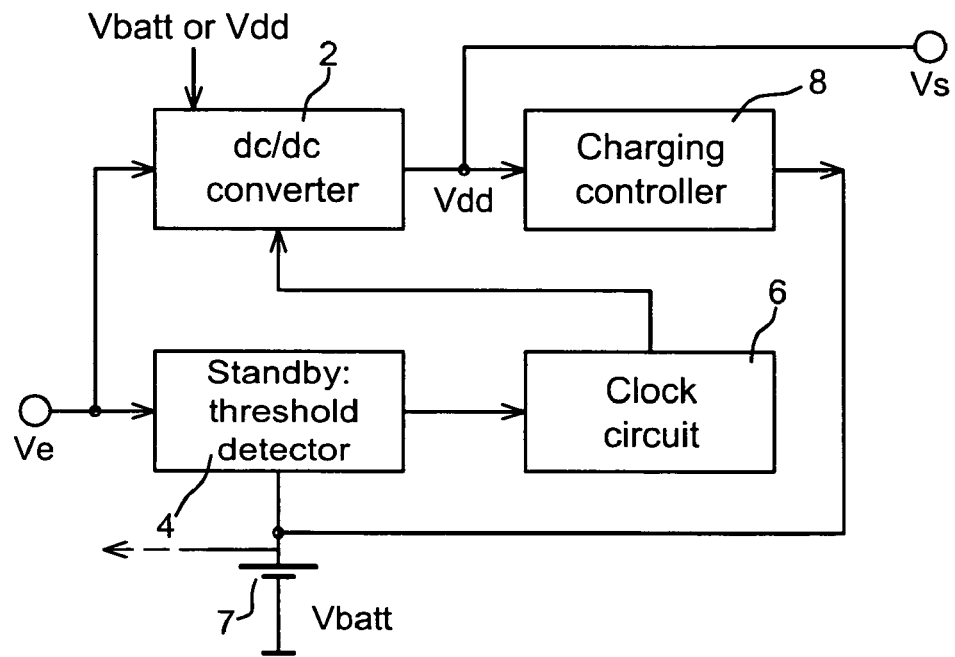
FIG. 1 illustrates a device according to the invention.

FIG. 1 illustrates an embodiment of the invention. The <<DC/DC converter>> block 2 comprises an up-converter filter, for example with pulse modulation.

Means 4 form a standby circuit for threshold detection.

This is a circuit preferably with very low power consumption, the role of which is to for example periodically sample an input voltage Ve in order to detect the occurrence of a source which may be used by the converter.

After detecting this source, a clock circuit 6 is triggered.

Otherwise, internal means 7 for supplying power or forming an energy reservoir are applied, for example a battery or an internal micro-battery.

These means 7 allow the converter 2 to be started when the input voltage Ve is insufficient.

In FIG. 1, the reference <<Vbatt or Vdd>> indicates that the converter 2 is powered either by the means 7 or by Vdd, the selection being performed by switching means.

After starting the converter, the latter provides a voltage Vout which may be externally used by an external electronic circuit.

This voltage provided by the converter may further be used internally, for example for recharging the means 7 in view of their subsequent use, notably if they have been discharged during the starting of the converter 2.

This recharging may be performed by charging control means 8.

Other improvements may be added, such as an external circuit for disconnecting the micro-battery or a recharging circuit internal to the controller.

Figure 2:
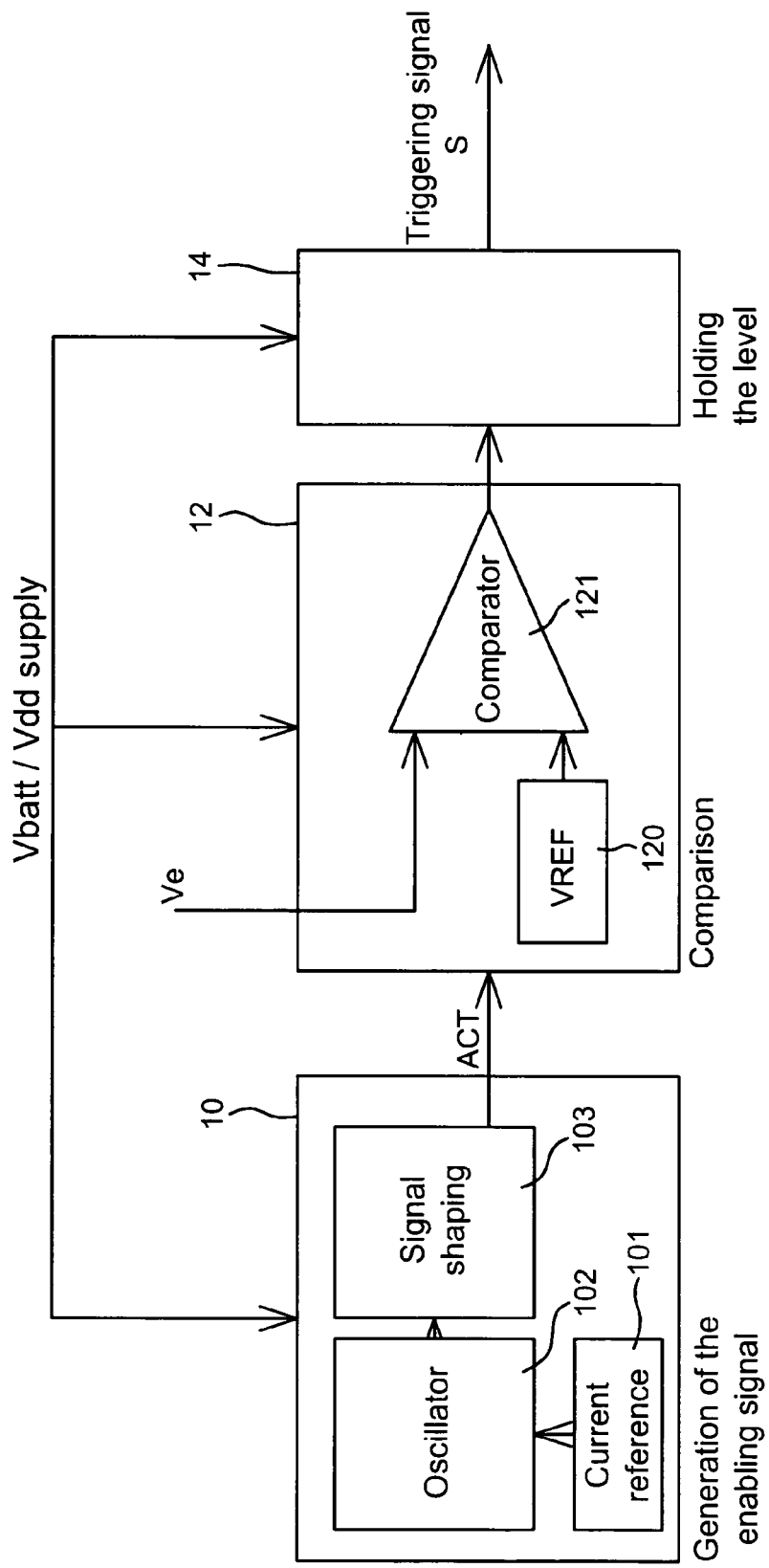
FIG. 2 illustrates an embodiment of standby means.

An embodiment of the standby circuit means 4 is illustrated in FIG. 2.

These means are powered by the input voltage provided by the means 7 or by the output voltage Vdd.

With them, it is possible to detect, for example by comparing the input voltage Ve with a reference voltage threshold S1, when this input voltage is sufficiently high or larger than the threshold S1, in order to be able to start the converter 2.

This threshold is the minimum operating voltage (40 mV for example).

If this circuit 4 did not exist, a situation might occur where the means 7 (the energy reservoir) would be completely discharged and the system would then only start for input voltages Ve larger than 0.8 V, for example.

In order to limit consumption of the standby circuit, monitoring of the input voltage may be performed in a sampled or periodic way.

As illustrated in FIG. 2, the standby circuit for example comprises means 12 with which, by means of a comparator 121, the input voltage Ve may be compared with a reference voltage VREF provided by means 120 generating such a reference voltage. This comparison may be periodically enabled by an enabling signal ACT.

If the input voltage Ve is larger than the voltage threshold value, the means 4 produce a signal S for triggering the converter 2, for example by means of the control of the clock 6 (FIG. 1).

The converter 2 may then be directly powered by the voltage storage 7.

The means 4 only allow the reservoir 7 to deliver its voltage when the input voltage Ve is larger than this threshold value. Crossing the threshold value indicates an increase in the input voltage, a criterion according to which the power supply of the converter may reasonably be triggered by the means 7.

If the input voltage should again fall under the threshold S1, the means 7 would again be disconnected so as to no longer power the converter.

They will also be disconnected if the voltage Vdd generated by the converter 2 during operation exceeds another threshold value, for example about 1 volt.

The means 10 generate an enabling signal ACT.

These means 10 for example comprise means 101 generating a current reference, oscillator means 102 and means 103 for shaping the ACT signal.

With means 14, it is possible to maintain the level of the result of the comparison when the means 12 are disabled, notably between two enabling signals ACT. These means for example comprise a digital flip-flop, for example a D flip-flop.

The means 10 and 14 may operate permanently; they are then preferably designed so as to consume as less power as possible.

With a current of the order of a few tens of nano-amperes, the enabling signal ACT may be generated under 2V, and the current consumption level may be maintained (in the means 14) at about a few nano-amperes, which is compatible with the use of a power supply micro-battery 7 as an energy reservoir.

The allowed consumption for the comparison means 12 is all the smaller because the enabling of this block is frequent.

For example, comparison means 12 may consume 2 µA and be enabled for one second every hour.

In this FIG. 2, the reference <<Vbatt/Vdd supply>> indicates that the different components of the system are either powered by means 7 or by Vdd, the selection being performed by switching means.

Figure 3:
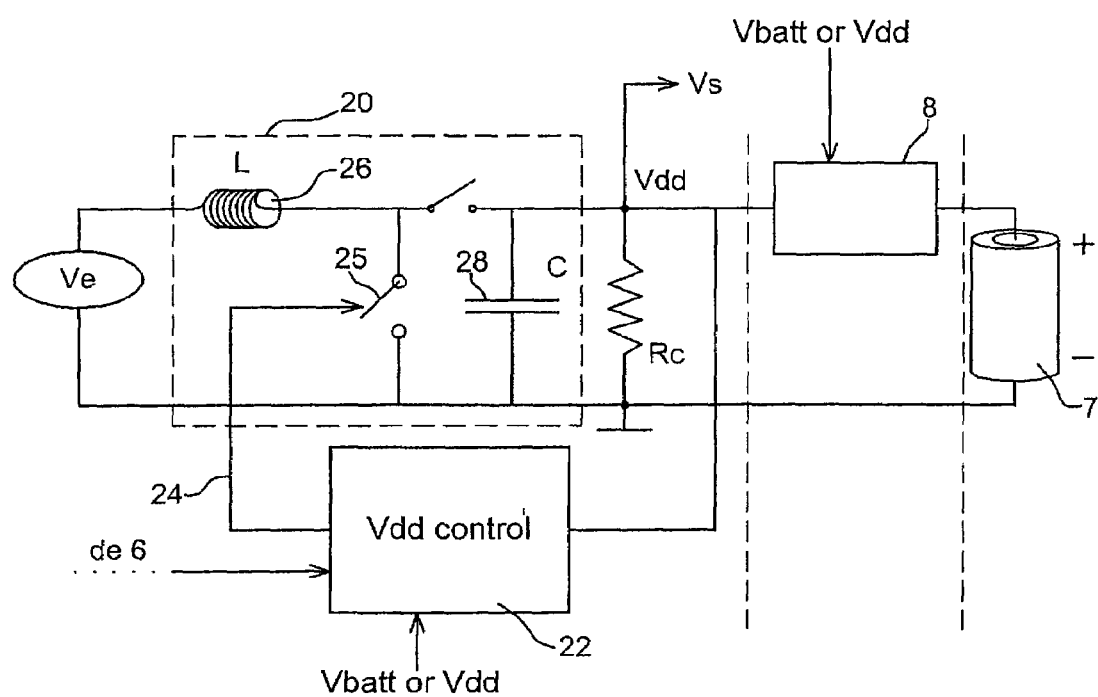
FIG. 3 illustrates an embodiment of converter and charge control means.

FIG. 3 illustrates an embodiment of the converter means 2 and of the charging means 8.

The converter means 2 may comprise means 20 forming an up-converter filter with means 22 for controlling Vdd (for example control means by pulse modulations or pulse density control means associated with a PID <<Proportional Integral Derivative >>type control).

The means 22 may send, via the means 24, a signal to a switch 25, a signal which will close or open this switch.

The means 20 further comprise an inductor 26 L and a capacitor 28 C; both of these components may be external.

The Rc component represents an external circuit to be supplied with the output voltage Vdd from the converter means 20.

These different means of FIG. 3 operate as explained in the book <<Alimentation à découpage>> (Switching power supply), IUT, BTS, Ecoles d'Ingénieurs, Cours et Exercices Corrigés, $2^{nd}$ Edition, M. Girard, H. Angelis and M. Girard, Ed. Dunod, Collection Science Sup., published on 18 Nov. 2003.

When the Ve signal is larger than the threshold $S_1$, a clock signal formed by the clock circuit means 6 (FIG. 1) is provided to the control means 22 under the control of the means 4, as explained above. The means 22 may be triggered with this clock signal, and so the power supply of the converter either with the external voltage Ve or with the voltage from the means 7.

The desired voltage may be reached with the controller 22. It may also advantageously, when Vdd reaches a predefined threshold $S_2$, disconnect the means 7, the DC/DC converter being then powered by $V_{DD}$.

The means 8 are means for charging the means 7 with current, for example a micro-battery, during operation of the device.

The means 8 are adapted to the maximum available output currents. Indeed, as any electronic circuit, they are designed in order to operate under pre-established conditions: it is therefore stated that they are <<adapted>>. For example they comprise a current mirror.

In this FIG. 3, the reference <<Vbatt or Vdd>> indicates that the means 8, 22 are either powered by the means 7 or by Vdd, the selection being performed by switching means.

A device such as the one of FIG. 1 applies energy storage means 7 in view of starting converter means if the input voltage Ve is insufficient.

With these means 7, it is therefore possible to produce a voltage for starting this converter.

According to one embodiment, they may then be recharged by the latter, the output voltage Vdd of which is larger than its input voltage.

These means 7 for example are a battery or a micro-battery as in the example illustrated above, in connection with FIG. 3.

A micro-battery may be made by using methods comparable to those for example shown on http://www.cea-technologies.com/energie/67-201.html. With such methods, it is possible to make batteries which provide a voltage from 2 to 2.5 V.

Figure 6:
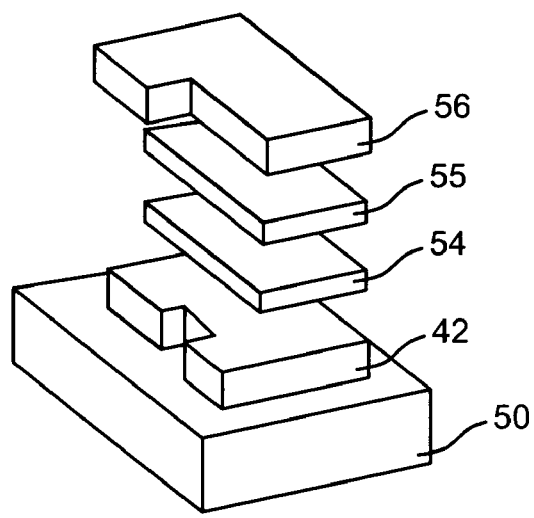
FIG. 6 illustrates a micro-battery example.

Such a micro-battery is for example illustrated in FIG. 6.

It comprises a silicon substrate 50, a platinum current collector 52, a titanium sulphide electrode 54, a LIPON (<<lithium phosphate oxinitride>>) electrolyte 55 and a metal lithium electrode 56. The layers are deposited by a PVD technique on the substrate and add up to a thickness of about 10 micrometers. At the surface, the micro-battery is about a few $mm^2$.

If a device according to the invention is made as an integrated circuit, the battery may be an integral part of the method for making the integrated circuit; it is then invisible for the user.

The means 7 may, by design (for example by selecting the materials of the architecture), be made so as to have a negligible self-discharge rate.

In this case, they may be charged as soon as they are built, and may wait for enabling of the standby circuit 4, for the case when an input voltage Ve would be insufficient.

The latter triggers the operation of the converter 2 if and only if there is a voltage Ve which may be used at its input, or else, it resorts to the energy reservoir 7 for starting the converter.

The energy reservoir 7 is then charged in order to start the converter, if the input voltage Ve is insufficient, for example taking into account the comparison performed by the means 12 described above.

Moreover, the means 7 may be charged when the circuit is positioned, for example on an electronic card, and at any appropriate time, either by starting the converter 2 with a sufficient input voltage Ve in order to exceed the threshold, and therefore provide recharging of the means 7 by the output voltage of said converter, or by a specific recharging input. This operation is all the more limited in time because the battery may be recharged rapidly.

Figure 7:
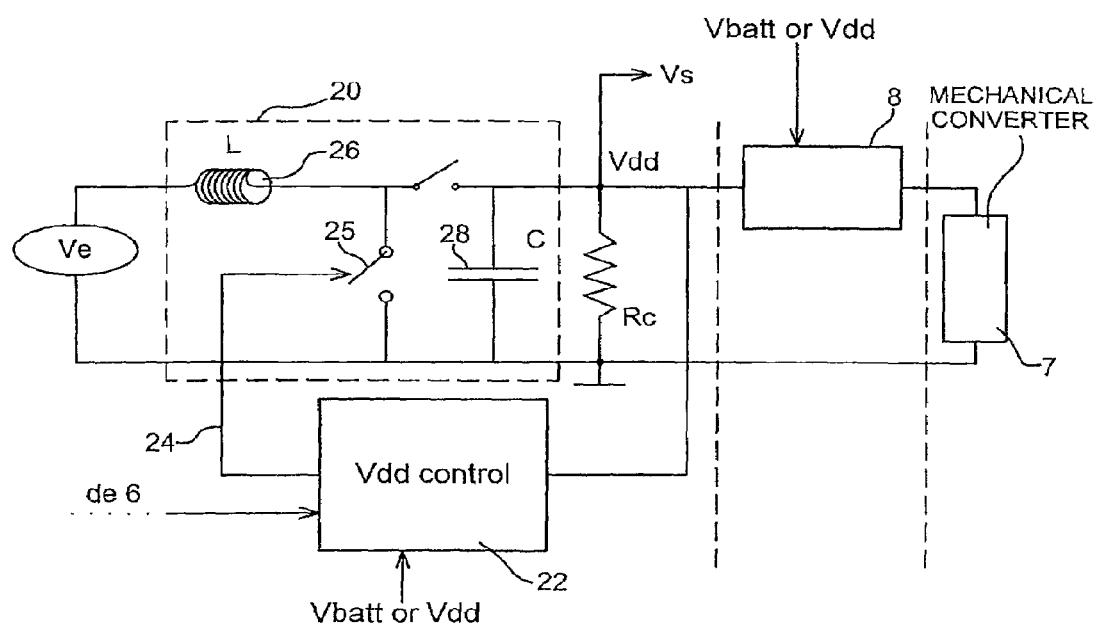
FIG. 7 illustrates an embodiment of converter and charge control means.

Finally, the example of a battery was given, but the voltage for starting the means 2 may be delivered by something else, other than a battery, for example by a mechanical converter 70 (for example by a compressed string). FIG. 7 is identical to FIG. 3, except that it shows the mechanical converter instead of the battery as means 7.

The energy reservoir for example is a battery or a microbattery and preferably it is rechargeable. The device may comprise as explained above, a recharging system powered by the output voltage of the converter. The battery or the micro-battery is preferably integrated.

The following example, illustrated by means of FIGS. 4A-4D and 5A-5C, shows a system as it has just been described, with an input detection threshold S1 of 40 mV and a desired voltage Vdd of 1.2 V. The rated voltage of the means 7 (here: a micro-battery) is 1.5 V.

FIGS. 4A-4D illustrate the change over time of the voltages, of the input voltage Ve, of the voltage on the terminals of the power supply means 7, of the power supply voltage generated outwards, of the power supply voltage of the means 4 and of the means 2 (standby and converter means), respectively.

Figure 5A:
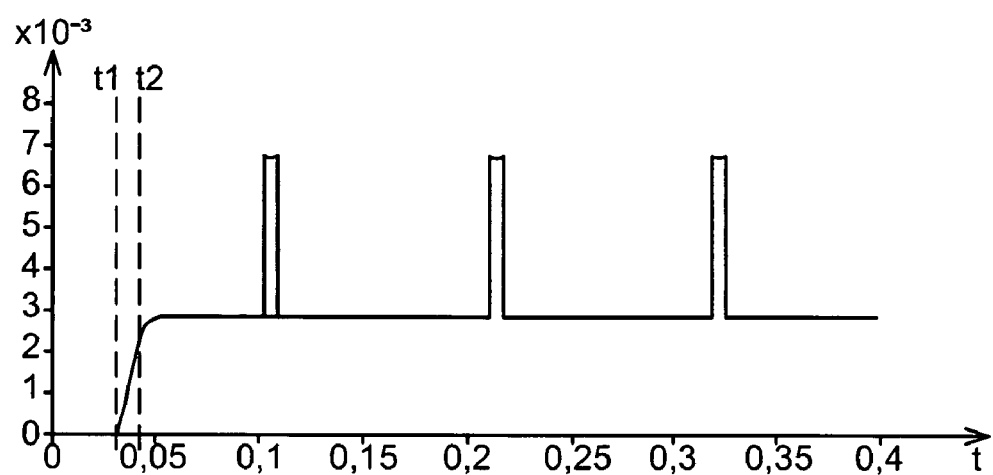
Figure 5B:
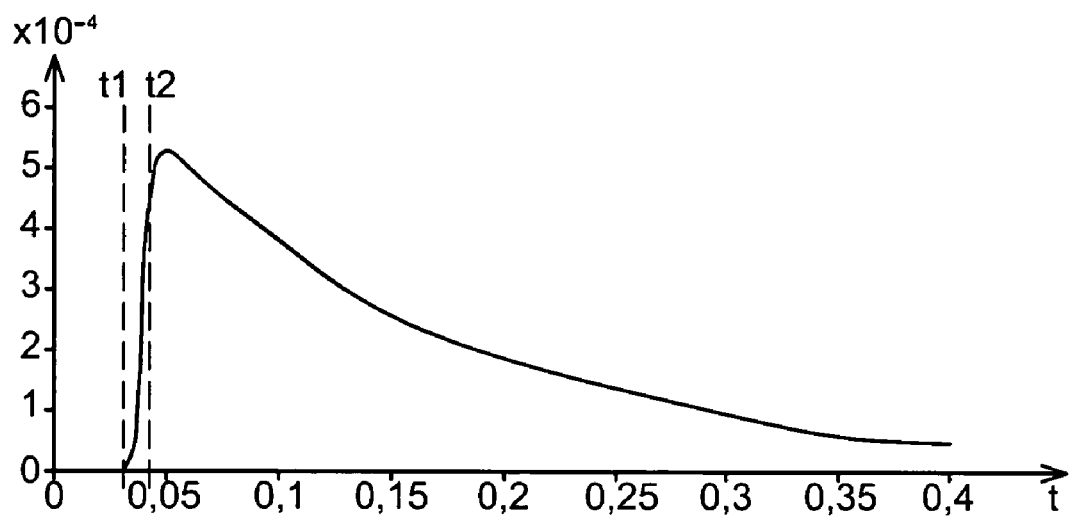
Figure 5C:
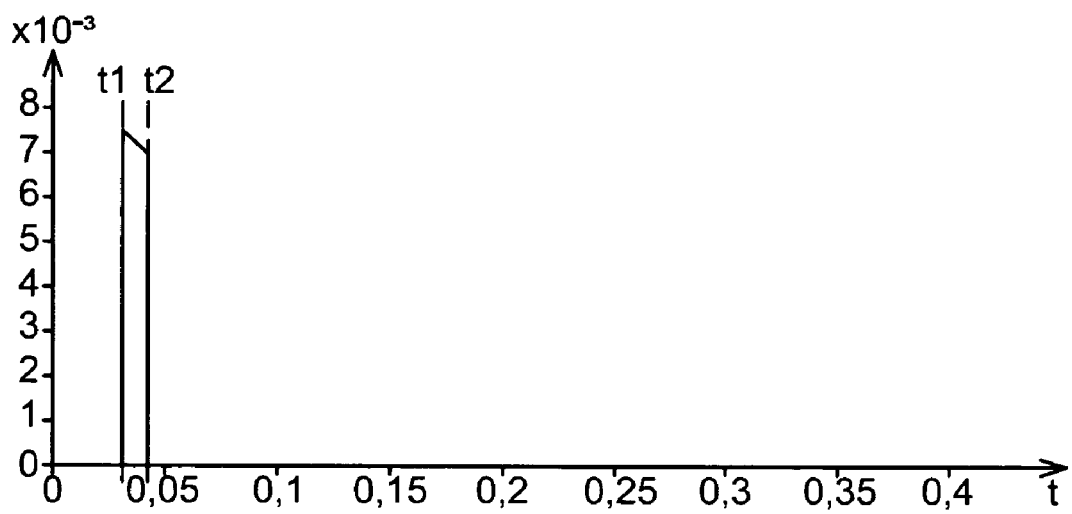

FIGS. 5A-5C illustrate the change over time of the currents, of the current consumed by the external circuit Rc, of the current charging the battery (current entering the battery) and of the current consumed on the battery (current flowing out of the battery).

Portion 1 (between 0 and t1): as long as the input has a power less than a set threshold, and voltage less than a set threshold S1 (here the threshold is 40 mV), only a portion of the standby means 4 operates (there is generation of the enabling signal ACT and the output level is maintained, the comparator operating periodically). The micro-battery 7 exclusively powers the standby circuit and consumption is minimal.

Portion 2 (between t1 and t2): when the input voltage exceeds the set threshold (40 mV), the DC/DC converter means start to operate. Up to the moment when the output voltage produced by the means 2 is stable and larger than $S_2$, for example, 1 V, the micro-battery 7 continues to power the whole circuit. Consumption is significant, but for a reduced period. In other words, from t1 to t2, the DC/DC converter will <<pump>> power from the battery, the voltage of which will fall (FIG. 4B), whereas the power supply voltage Vdd generated outwards (FIG. 4C) increases, i.e., the power supply voltage of the standby circuit and of converter circuit 4 falls (FIG. 4D), Vdd will be able to gradually take over.

Figure 4A:
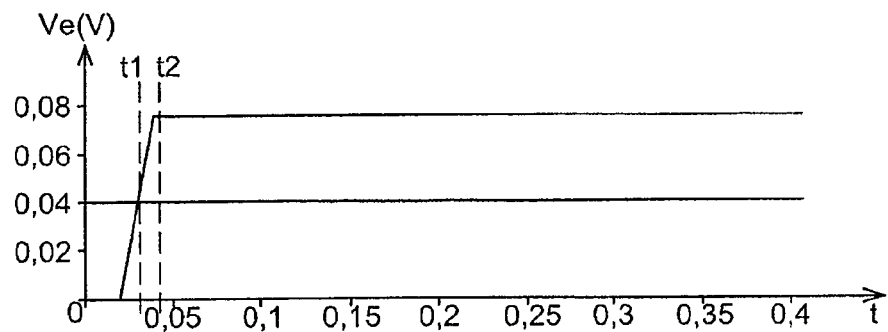
FIGS. 4A-4D and 5A-5C illustrate an exemplary embodiment of the invention.
Figure 4B:
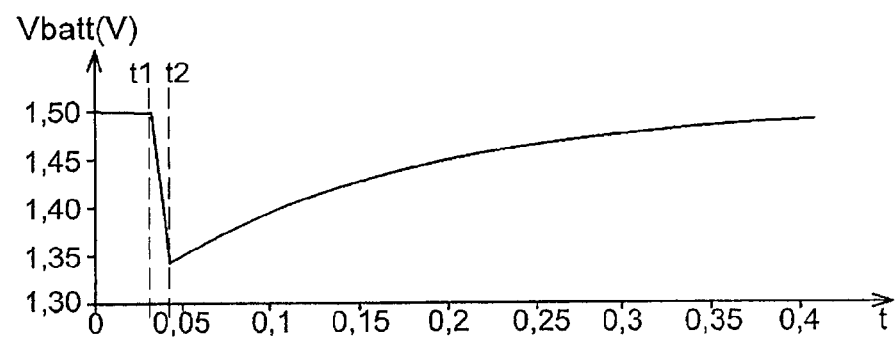
Figure 4C:
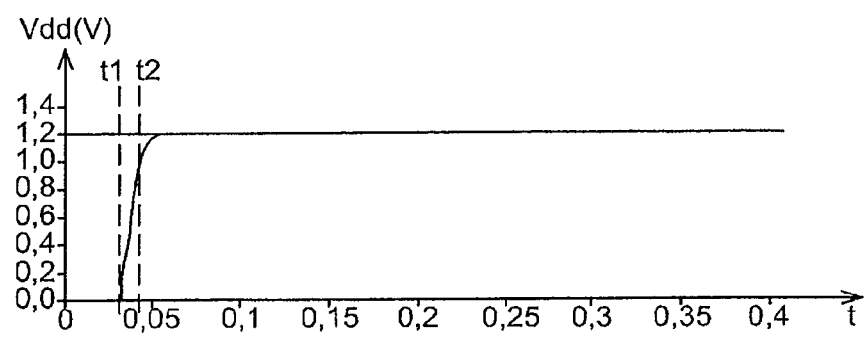
Figure 4D:
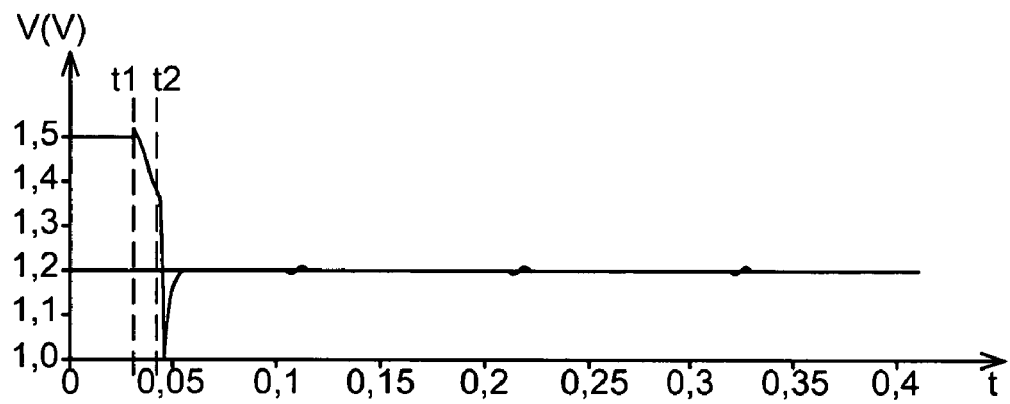

Portion 3 (t>t2): with the generated power supply voltage Vs (=Vdd) (1.2 V), it is possible to power the means 2 forming a DC-DC converter, the external circuit and to recharge the micro-battery 7 (FIG. 4B).

The invention therefore proposes a new device, for example of the monolithic integrated circuit type, with which the voltage of power sources may be converted into a voltage which may be used by electronic circuits, and capable of operating with extremely low input voltages, up to a few tens of mV.

In this way, most power sources presently used may be utilized until their quasi-complete discharge, which therefore brings savings.

On the other hand, the invention allows the use of new power sources, not used hitherto because of their too low voltage.

The device according to the invention is compatible with the industry of integrated circuits; it may be integrated into the manufacturing process: the designer of electronic circuits does not have to be concerned with the assembling of more or less esoteric circuits either new or difficult to apply.

Moreover, the invention does not increase the volume usually dedicated to the voltage conversion function.

Now, as mentioned earlier, the invention is able to provide designers and in particular electronics engineers with a DC/DC converter which may handle extremely low input voltages, up to a few tens of mV.

Finally, with the described embodiment, a monolithic integrated circuit with an architecture and circuit which handle the charging, may be obtained, and an integrated micro-battery is made available, which provides sufficient voltage to the transistors of a converter for them to operate.

The invention claimed is:

1. A DC voltage conversion device comprising:
  a DC/DC converter configured to convert an input signal into an output signal;
  an energy reservoir configured to power a threshold detector in order to provide a triggering signal to start the converter; and
  a threshold detector configured to sample the input signal, and to detect an occurrence of a voltage of the input signal that may be used by the converter, the threshold detector configured to allow a triggering signal to be delivered to the converter when the input signal is larger than a threshold,
  wherein the input signal is delivered to the DC/DC converter by a power source different from the energy reservoir.

2. The device according to claim 1, the threshold detector comprising a comparator configured to compare the input voltage with a reference voltage.

3. The device according to claim 2, the threshold detector comprising a signal sampling unit configured to sample the input voltage periodically.

4. The device according to claim 1, the threshold detector comprising a signal sampling unit configured to sample the input voltage periodically.

5. The device according to claim 1, further comprising a PID controller.

6. The device according to claim 1, further comprising a disconnecting unit configured to disconnect the energy reservoir, so that the energy reservoir no longer powers the converter, when the voltage generated by the converter exceeds a threshold value.

7. The device according to claim 1, further comprising an up-converter filter and a controller.

8. The device according to claim 1, wherein the energy reservoir comprises a micro-battery.

9. The device according to claim 1, wherein the energy reservoir comprises a mechanical converter.

10. The device according to claim 1, further comprising a clock circuit that is triggered when an input voltage is larger than a threshold value, the clock circuit configured to send a pulse to start the converter.

11. The device according to claim 10, further comprising a recharging unit configured to recharge the energy reservoir when the converter operates.

12. The device according to claim 10, further comprising a PID controller.

13. The device according to claim 10, further comprising a disconnecting unit configured to disconnect the energy reservoir, so that the energy reservoir no longer powers the converter, when the voltage generated by the converter exceeds a threshold value.

14. The device according to claim 10, further comprising an up-converter filter and controller.

15. The device according to claim 1, further comprising a recharging unit configured to recharge the energy reservoir when the converter operates.

16. The device according to claim 15, further comprising a disconnecting unit configured to disconnect the energy reservoir, so that the energy reservoir no longer powers the converter, when the voltage generated by the converter exceeds a threshold value.

17. The device according to claim 15, further comprising an up-converter filter and a controller.

18. The DC voltage conversion device according to claim 1, wherein the DC voltage conversion device is configured to convert very low input voltages into output voltages usable by an electronic system.

19. The DC voltage conversion device according to claim 1, further comprising:

a charge control unit configured to use the output signal from the DC/DC converter to recharge the energy reservoir.

* * * * *